Nov. 24, 1970  G. O. STEGNER  3,543,158
APPARATUS FOR ESTABLISHING ELECTRICAL CONTACT WITH ELECTRICAL
COMPONENTS OF VARYING BODY SIZES AND TERMINAL SPACINGS
Filed July 2, 1968  3 Sheets-Sheet 1
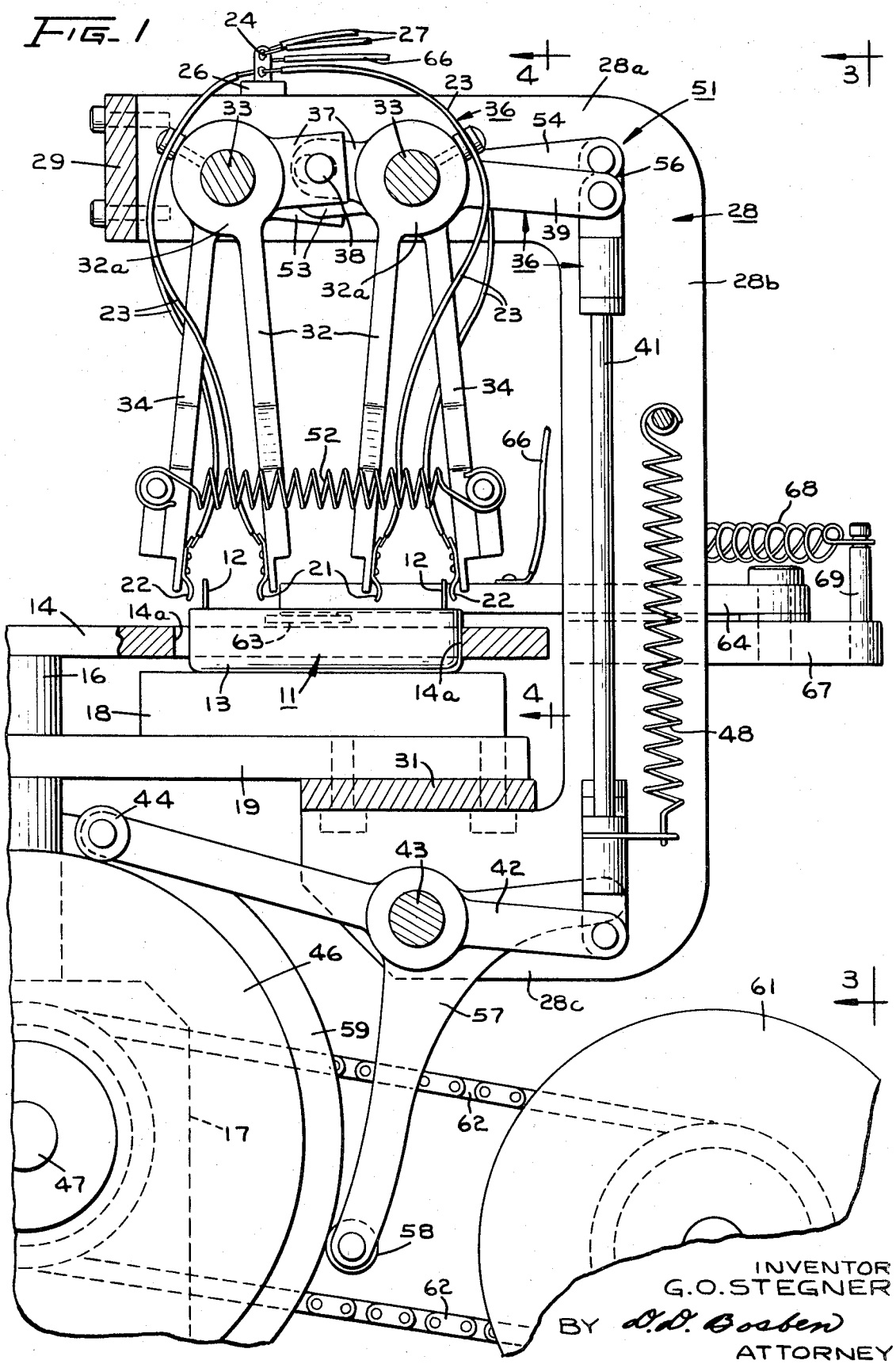
INVENTOR
G.O. STEGNER
BY D.D. Bosben
ATTORNEY Nov. 24, 1970  G. O. STEGNER  3,543,158
APPARATUS FOR ESTABLISHING ELECTRICAL CONTACT WITH ELECTRICAL
COMPONENTS OF VARYING BODY SIZES AND TERMINAL SPACINGS
Filed July 2, 1968  3 Sheets-Sheet 2
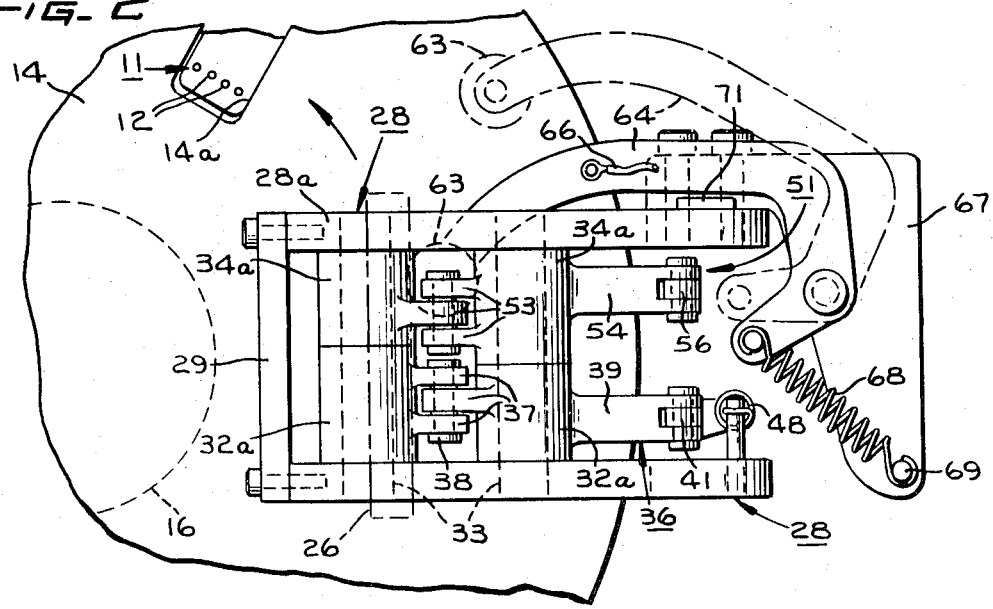
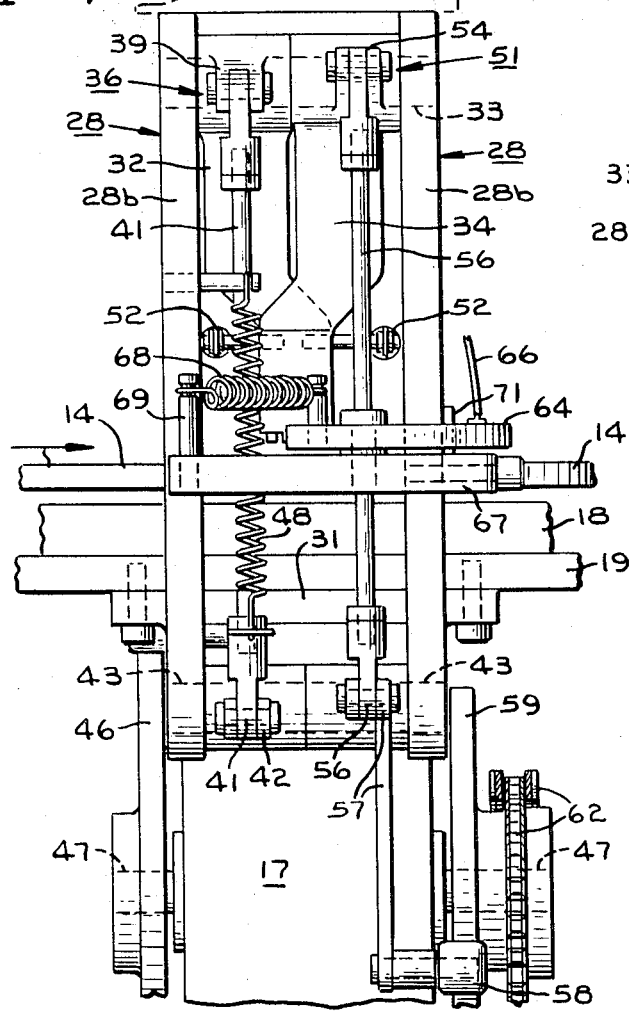
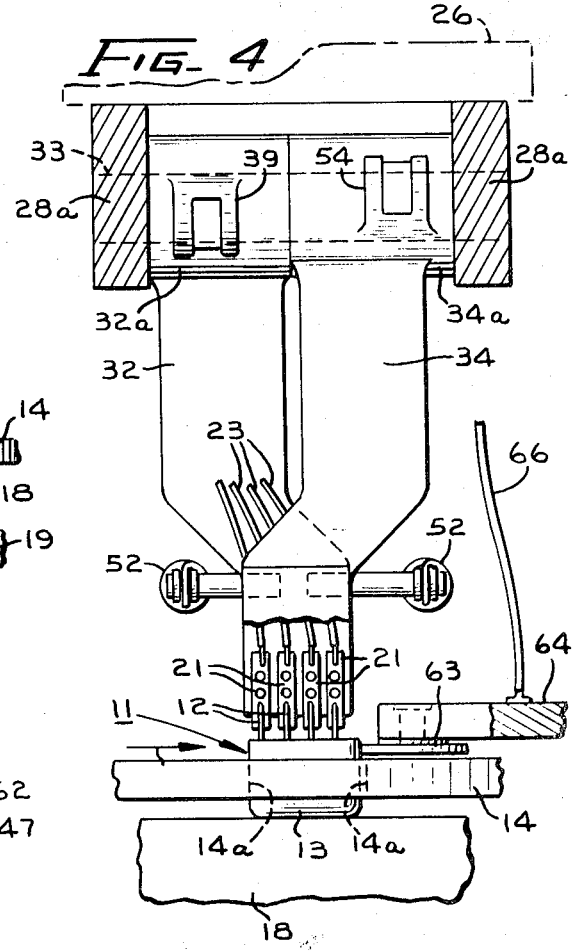

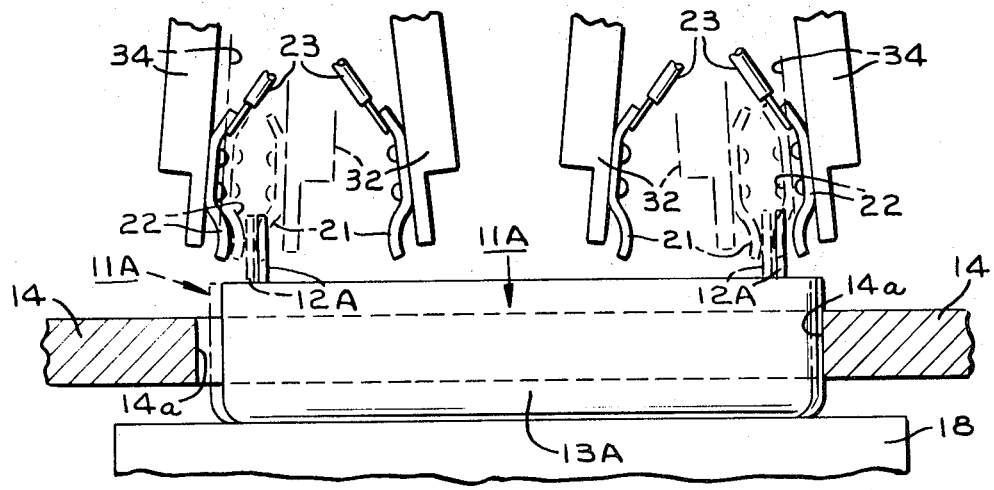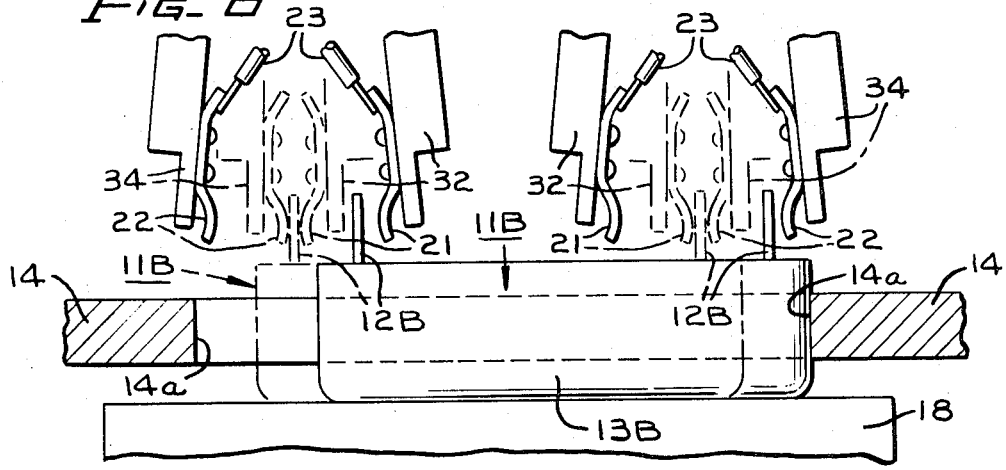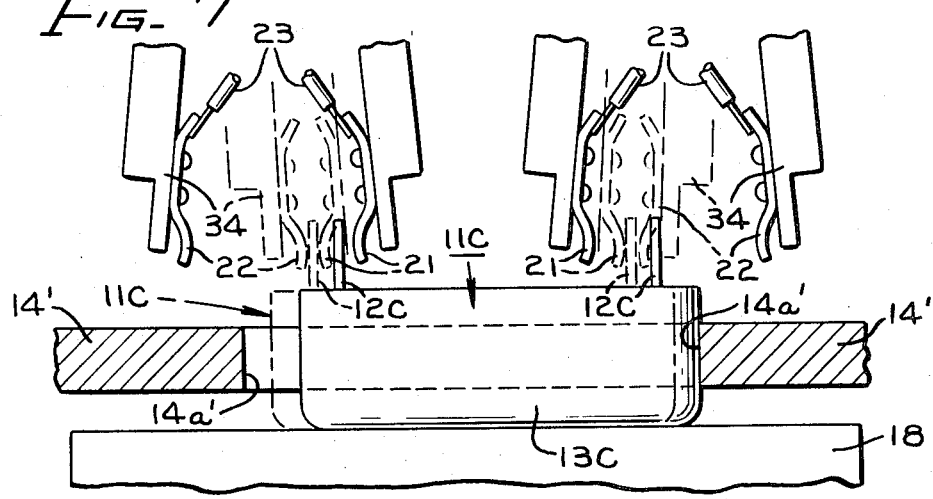

United States Patent Office 3,543,158
Patented Nov. 24, 1970

3,543,158
APPARATUS FOR ESTABLISHING ELECTRICAL CONTACT WITH ELECTRICAL COMPONENTS OF VARYING BODY SIZES AND TERMINAL SPACINGS
Gustav O. Stegner, Essex Center, Vt., assignor to Western Electric Company, Incorporated, New York, N.Y., a corporation of New York
Filed July 2, 1968, Ser. No. 742,007
Int. Cl. G01r 31/00
U.S. Cl. 324—158                                5 Claims

ABSTRACT OF THE DISCLOSURE

Apparatus for testing electrical components having spaced terminals extending from one side thereof, wherein the components are of varying lengths or the terminals are of varying spacings, includes a support for the component permitting limited movement of the component longitudinally, test contacts located adjacent the terminals, and a resilient mechanism for moving the test contacts simultaneously in opposite directions against sides of the terminals, to centralize the component on the support relative to the test contacts and to exert uniform pressure on the terminals. If desired, second test contacts may be electrically connected in parallel with respective ones of the first test contacts and a second resilient mechanism may be provided for moving the second test contacts simultaneously against opposite sides of the terminals so that the terminals are firmly gripped between the first and second test contacts.

BACKGROUND OF THE INVENTION

Field of the invention

This invention relates to the testing of electrical components, and particularly to electrical components having spaced terminals extending from one side thereof. Apparatus in accordance with the invention is particularly suited for testing of electrical components, such as reed relays used in electronic communications systems, in which the spacing between the terminals varies depending upon the type or size of the component.

Description of the prior art

Heretofore, the terminals of an electrical component to be electrically tested have been electrically connected to test circuitry in a variety of manners. For example, it is common practice to insert the terminals directly into suitable sockets or receptacles wired to the test circuitry. In other apparatus the component may be positioned in a nest at a test station, or in a carrier which moves the component into the test station, whereupon test probes, which are spaced apart a fixed distance corresponding to the spacing between the terminals, are moved into engagement with the terminals. The terminals also may be connected to the test circuitry manually by leads and alligator clips.

In general, the above-described procedures are not satisfactory where a single test set is to test a number of components of varying sizes and terminal spacings. For example, where sockets or receptacles receive the component and its terminals, a different socket or receptacle must be provided for each size of component or terminal spacing. Similarly, where the component is positioned in a nest and test probes spaced a fixed distance apart are movable into engagement with the terminals of the component, different size nests must be provided for each size component, and differently spaced probes must be provided for each terminal spacing. The use of test leads and alligator clips, of course, is laborious and time consuming, particularly where a large number of components are involved.

SUMMARY OF THE INVENTION

An object of the invention is to provide a new and improved apparatus for the testing of an electrical component having spaced terminals projecting from one side thereof.

Another object of the invention is to provide a new and improved apparatus for testing electrical components of varying sizes and having projecting terminals of varying spacings, in which the terminals readily can be electrically connected to test circuitry.

In accordance with the invention, apparatus for testing an electrical component having spaced terminals projecting from one side thereof includes means for supporting the component for movement substantially parallel to a line extending between the terminals. A pair of test contacts is mounted adjacent the terminals for movement toward and away from one another and the terminals, and yieldable means are provided for moving the contacts substantially simultaneously in opposite directions and into engagement with respective ones of the terminals to effect contralization of the component on the supporting means relative to the contacts, and so that each of the contacts engages its respective terminal with a predetermined uniform pressure sufficient to establish electrical contact between the contact and the terminal.

More specifically, each test contact of the pair of test contacts is mounted on a respective one of a pair of pivoted arms which are interconnected so that they move in unison. Resilient means move the arms and the test contacts thereon so that the contacts become engaged with their respective terminals, and means are provided for moving the arms and the test contacts thereon away from the terminals against the action of the resilient means. A second pair of test contacts are electrically connected in parallel with respective ones of the first pair of test contacts and are mounted adjacent the terminals for movement toward and away from one another and the terminals, the first pair of test contacts being located between the terminals and the second pair of test contacts being located adjacent outer sides of the terminals. After the operation of the first resilient means, a second resilient means moves the second pair of test contacts substantially simultaneously into engagement with the outer sides of respective ones of the terminals so that the first and second pairs of test contacts firmly grip the terminals therebetween.

BRIEF DESCRIPTION OF THE DRAWINGS

FIG. 1 is a front elevational view of the apparatus, partially in cross section;
FIG. 2 is a partial plan view of the apparatus;
FIG. 3 is a side elevational view of the apparatus, as viewed in the direction of the arrows 3—3 in FIG. 1;
FIG. 4 is a cross-sectional, elevational view of the apparatus, taken along the lines 4—4 of FIG. 1;
FIG. 5 is an enlarged, partial view of the apparatus illustrating its operation in connection with an electrical component having a certain size and terminal spacing; and
FIGS. 6 and 7 are views similar to FIG. 5, illustrating the operation of the apparatus in connection with electrical components having different sizes and terminal spacings.

DETAILED DESCRIPTION

The disclosed apparatus is designed for use with suitable test circuitry (not shown) for testing electrical components 11 of different sizes and terminal spacings for electrical characteristics, such as continuity and shorts. In the illustrated embodiment of the invention, the electrical components 11 are shown as reed relays of a type used in electronic communications equipment. Each of the reed relays 11 has rows of terminals 12 projecting from one side thereof adjacent its opposite ends, and for purposes of illustration each row of terminals is shown as having four terminals therein (FIG. 4). The terminals 12 are embedded in insulation in a plastic or metallic housing 13 and the terminals adjacent each end of the relay are electrically connected to respective ones of the terminals adjacent the opposite end of the relay by normally closed, internal contacts (not shown) in a well known manner.

FIG. 5, 6 and 7, respectively, illustrate portions of the apparatus in conjunction with reed relays 11A, 11B, and 11C having housings 13A, 13B, and 13C of different lengths and rows of terminals 12A, 12B, and 12C of different spacings, which the disclosed apparatus is designed to handle without any substantial change in the construction or arrangement of the apparatus. In this connection, as is apparent from FIGS. 5, 6 and 7, the length of the housing 13A of the reed relay 11A and the spacing between the rows of its terminals 12A are greater than the lengths of the housings 13B and 13C of the reed relays 11B and 11C and the spacings between their rows of terminals 12B and 12C. Similarly, the length of the housing 13B of the reed relay 11B and the spacing between its rows of terminals 12B are greater than the length of the housing 13C of the reed relay 11C and the spacing betwen its rows of terminals 12C.

Referring to FIGS. 1 through 4, it is seen that the apparatus includes a horizontally disposed, rotatable feed plate 14 for indexing the relays 11 into and out of a test station shown in these figures. The feed plate 14 is removably secured to the upper end of a vertically extending, rotatable shaft 16 in a suitable manner, and the shaft is connetced adjacent its lower end to a suitable intermittent drive mechanism (not shown) in a drive housing 17. A plurality of elongated, radially extending slots 14a, in which the relays 11 are positioned in a suitable manner at a station preceding the test station, are provided in the feed plate 14 adjacent its periphery. During the indexing of the relays 11 into and out of the test station they ride on a curved track 18 secured to the top of a horizontally disposed platform 19, which is suitably supported in a manner not shown and which is provided with an aperture through which the vertical drive shaft 16 for the feed plate extends.

The apparatus includes two sets of test contacts, one set including a pair of rows of inner test contacts 21 and the other set including a pair of rows of outer test contacts 22 in opposed relationship to respective ones of the rows of inner test contacts. In the illustrated embodiment of the invention there are four test contacts shown in each row of test contacts, and thus the apparatus is capable of handling a relay 11 having up to four terminals adjacent each of its opposite ends.

When one of the relays 11 is indexed by the feed plate 14 into the test station, the terminals 12 adjacent each end of the relay are moved into positions between respective ones of the opposed inner and outer test conttacts 21 and 22. In this regard, the test contacts 21 and 22 are movable into open positions, as shown in solid lines in FIGS. 1, 5, 6, and 7, to permit this movement of the terminals 12 herebetween, and also are movable into closed positions, as shown in dashed lines in FIGS. 5, 6 and 7, in which they engage respective ones of the terminals therebettween.

The test contacts 21 and 22 are electrically connected by leads 23 to respective laterally spaced terminals 24 on a terminal strip 26, which each of the inner test contacts 21 and its opposed outer test contact 22 being connected in parallel to the same terminal 24. The terminals 24 are suitably connected to the above-mentioned test circuitry (not shown) by leads 27 so that when the test contacts 21 and 22 engage the terminals 12 of the relay 11 the desired electrical tests acn be performed on the relay.

The terminal strip 26 is mounted on a pair of laterally spaced, C-shaped brackets 28 by being suitably secured across horizontally projecting upper arms 28a thereof. Outer free ends of the arms 28a are secured together by an upper cross member 29. The brackets 28 also include vertically extending bight portions 28b and lower horizontally projecting arms 28c which are secured together by a lower cross member 31, by means of which the brackets are secured to the underside of the platform 19 by suitable screws.

Each row of inner test contacts 21 is mounted on a lower end portion of a vertically disposed arm 32 having a hub 32a adjacent its upper end, by means of which it is journalled on a respective one of two horizontally extending shafts 33. Similarly, the row of outer test contacts 22 in opposed relationship to this row of inner test contacts 21 is mounted on a lower end portion of a vertically disposed arm 34 journalled adjacent its upper end on the same shaft 33 by means of a hub 34a (FIGS. 2, 3, and 4). As is best shown in FIG. 4, to achieve this arrangement the upper and lower portions of each of the arms 32 and its associated arm 34 are offset relative to one another and are interconnected by integral inclined intermediate portions, with the lower portions of the arms and respective ones of the contacts 21 and 22 thereon thus in opposed relationship. The opposite ends of each shaft 33 are fixedly mounted in the upper arms 28a of the C-shaped brackets 28.

The arms 32 and the inner test contacts 21 thereon are movable between their open positions and their closed terminal-engaging positions in unison by an operating mechanism 36. The operating mechanism 36 includes a lug 37 (FIGS. 1 and 2) projecting from the hub 32a of one of the arms 32 and between a pair of similar lugs 37 on the hub 32a of the other arm 32. The lugs 37 are interconnected so that the arms 32 move in unison, by a pin and slot connection 38 including a pivot pin mounted in apertures in the pair of lugs and extending through a slot in the central lug. A projecting lever arm 39 also is secured to the hub 32a of the first-mentioned arm 32 and has a bifurcated outer end portion which is pivotally connected to an upper end portion of a vertically extending actuating rod 41. Adjacent its lower end the actuating rod 41 is pivotally connected to a bifurcated end portion of a cam lever 42 journalled intermediate its ends on a horizontally extending shaft 43, the shaft 43 being fixedly mounted adjacent its opposite ends in the lower arms 28c of the C-shaped brackets 28. The cam lever 42, adjacent its opposite end, carries a cam follower 44 which is engaged with a cam 46 for moving the arms 32 to their open positions, the cam being fixedly mounted on an extension of a horizontal drive shaft 47 (FIGS. 1 and 3) journalled in the drive housing 17. The actuating rod 41 is biased upward to move the arms 32 and the test contacts 21 into their closed terminal-engaging positions by a vertically disposed coil spring 48 connected adjacent its upper end to a projecting pin on one of the C-shaped brackets 28 (best shown in FIG. 3) and connected adjacent its lower end to a laterally projecting member on the actuating rod.

The arms 34 and the outer test contacts 22 thereon are moved between their open positions and their closed terminal-engaging positions in unison by an operating mechanism 51. The operating mechanism 51 includes a pair of coil springs 52 disposed horizontally on opposite sides of the arms 32 and 34, each coil spring being connected adjacent its opposite ends to projecting pins on the arms 34 to bias them toward one another and into their closed positions. For the purpose of moving the arms 34 away from one another and into their open positions, projecting lugs 53, similar to the lugs 37, are provided on the hubs 34a of the arms 34 and are connected together by a pin and slot connection of the same type as the pin and slot connection 38 for the lugs 37. An operating lever 54 has an inner end thereof fixedly secured to the hub 34a of one of the arms 34 and has a bifurcated outer end portion pivotally connected to an upper end portion of a vertically extending actuating rod 56. A lower end portion of the actuating rod 56 is pivotally connected to one leg of a bell crank lever 57 journalled on the shaft 43. The other leg of the bell crank lever 57 is provided with a cam follower 58 which rides on a cam 59 secured to the horizontal drive shaft 47.

The horizontal drive shaft 47 drives the abovementioned intermittent drive mechanism for the drive shaft 16 of the indexible feed plate 14 through suitable gearing in the drive housing 17. The drive shaft 47 is driven in a conventional manner by a motor 61 connected thereto by a chain drive 62 as shown in FIGS. 1 and 3.

The cams 46 and 59 are designed so that the cam 46 first permits the coil spring 48 to move the arms 32 and the inner test contacts 21 from their open positions to their closed terminal-engaging positions as shown in dashed lines in FIGS. 5, 6, and 7, whereby the inner test contacts engage their respective terminals 12 on the relay 11 which is in the test position, to make electrical contact with the terminals, and to center and straighten the relay in its associated radial slot 14a in the feed plate 14. The second operating cam 59 then permits the coil springs 52 to move the arms 34 and the outer test contacts 22 into their closed terminal-engaging positions, whereby the terminals 12 of the relay 11 become firmly gripped between the inner and outer test contacts 21 and 22 to insure good electrical contact between the test contacts and the terminals.

From the foregoing description, it is seen that the apparatus can accommodate the reed relays 11 even though their housings 13 are of different lengths and they have different spacings between their rows of terminals 12. For example, referring to FIG. 5, in which the reed relay 11A represents a components having substantially the maximum terminal spacing which can be accommodated by the apparatus with a test contact spacing as disclosed in the drawing, it is seen that when the relay is indexed into the test station by the feed plate 14 the terminals 12A of the relay will be located closely adjacent the rows of outer test contacts 22. While the relay 11A could have a position in its associated radial slot 14a of the feed plate 14 anywhere along the length of the slot, for purposes of illustration the relay housing 13A is shown in FIG. 5 as having a position (solid lines) to the right of center in the radial slot and in abutment with the outer end of the slot. Thus, as the inner test contacts 21 are moved in unison by the operating mechanism 36, from their open solid line positions to their closed dashed line positions in FIG. 5, the left-hand inner test contacts 21 first will engage the inner sides of their associated terminals 12A to move the relay 11A longitudinally to the left in the slot 14a. Subsequently, the right-hand inner test contacts 21 will come into engagement with the inner sides of their respective terminals 12A to limit this movement of the relay, and the relay will assume a position as shown in dashed lines. If the relay 11A were to the left of center in the radial slot 14a when the relay was indexed into the test station, these functions of the left-hand and right-hand inner test contacts 21 would be reversed. In either situation, the rows of inner test contacts 21 make electrical contact with the terminals 12 and cooperate to center the relay 11A longitudinally in the radial slot 14a and relative to one another. If the radial slot 14a is of a width such that the relay can assume a skewed position therein, the inner test contacts 21 also will cooperate to straighten or orient the relay in the slot whereby each of the test contacts will come into proper engagement with its respective terminal 12A. The outer test contacts 22 then are moved in unison by their operating mechanism 51 into engagement with the outer sides of the terminals 12A, as shown in dashed lines in FIG. 5, whereby the terminals 12A are gripped firmly between the inner and outer test contacts 21 and 22 to complete the connection of the relay 11A to the above-mentioned test circuitry (not shown).

The reed relay 11B in FIG. 6 represents a component having substantially the shortest housing length that can be accommodated by the apparatus utilizing a feed plate 14 having radial slots 14a of a length as shown in FIG. 5. Thus, assuming that the relay 11B is abutted against one end of its associated radial slot 14a as it is indexed into the test station, as shown in solid lines in FIG. 6, one row of its terminals 12B will be closely adjacent one of the rows of inner test contacts 21, while the other row of its terminals 12B will be closely adjacent one of the rows of outer test contacts 22. Then, as the inner test contacts 21 are moved into their terminal-engaging positions, the left-hand inner test contacts and the right-hand inner test contacts engage the terminals 12B in sequence, as described hereinabove with reference to FIG. 5, to center and straighten the relay in the radial slot 14a. The outer test contacts 22 then are moved into their terminal-engaging positions whereby the terminals 12B of the relay 11B become firmly gripped between the inner and outer test contacts 21 and 22.

The relay 11C in FIG. 7 represents a component having substantially the minimum terminal spacing which can be accommodated by the disclosed apparatus. With the relay 11C, to insure that its terminals 12C will fall between the inner and outer test contacts 21 and 22 when the relay 11C is indexed into the test station, the feed plate 14 is replaced by a feed plate 14' having radial slots 14a' of less length than the radial slots 14a of the feed plate 14. In other respects, the apparatus is of the same construction and operates in the same manner as described above with reference to the relays 11A and 11B in FIGS. 5 and 6.

The apparatus also can accommodate reed relays 11 of different widths and heights, providing the spacing between the rows of the relay terminals 12 is such that they will fit between the inner and outer test contacts 21 and 22 when the relays are indexed into the test station, as above described. However, where the relays 11 are of substantially different widths and/or heights, to insure that the test contacts 21 and 22 will properly engage their respective relay terminals 12, it may be necessary to provide interchangeable feed plates 14 having varying width radial slots 14a, and to provide interchangeable curved tracks 18 of differing thicknesses.

One of the types of shorts in the reed relays 11 which the above-mentioned test circuitry is designed to test for, when the housing 13 of the relay is metallic in nature, is a short between the terminals 12 of the relay and the metallic housing. For this purpose, as the relay 11 is indexed into the test station its metallic housing 13 engages an electrical contact in the form of a roller 63 (FIGS. 1 through 4) on an outer end portion of a horizontally extending lever 64. The lever 64 is electrically connected by a lead 66 to one of the terminals 24 on the terminal strip 26, and the terminal 24 is connected to the above-mentioned test circuitry (not shown) by one of the leads 27. The lever 64 is pivoted intermediate its ends on a support member 67 secured to the intermediate portion 28b of the adjacent C-shaped bracket 28. A coil spring 68 is connected between an outer end portion of the lever 64 and an upstanding pin 69 on the support member 67 to bias the lever against a suitable stop 71 (FIGS. 2 and 3) on the bracket 28 and into a housing contacting position as shown in solid lines in FIG. 2. As the relay 11 is indexed out of the test station, the coil spring 68 permits the lever 64 to be moved to a dashed line position as shown in FIG. 2, whereby the indexing of the relay 11 is permitted to take place.

Parts of a relay sorting mechanism, which form no part of this invention and which therefore are not shown, are located at subsequent stations about the periphery of the feed plate 14. These parts of the sorting mechanism are controlled by the above-mentioned test circuitry (not shown) in a suitable manner so that as the relays 11 are indexed by the feed plate 14 to the subsequent stations, they are sorted, depending upon whether they are acceptable or defective, in a manner well known to those skilled in the art.

OPERATION

In operation, the motor 61 (FIG. 1), through the drive chain 62 and the horizontal drive shaft 47, causes rotation of the cams 46 and 59 of the test contact operating mechanisms 36 and 51, respectively, and drives the above-mentioned intermittent drive mechanism in the drive housing 17 to rotate the vertical drive shaft 16 intermittently and thereby index the feed plate 14 secured thereto.

The reed relays 11 are loaded into the radial slots 14a in the indexing feed plate 14 at a station preceding the test station shown in FIGS. 1 through 4, in any suitable manner. As the feed plate 14 is indexed it moves the relays 11 into and out of the test station in succession, with the relays riding on top of the curved track 18.

When one of the relays 11 is indexed into the test station, the terminals 12 adjacent each end of the relay are moved into positions between respective ones of the inner and outer test contacts 21 and 22. The cam 46 of the operating mechanism 36 for the inner test contacts 21 then permits the coil spring 48 to move the vertical actuating rod 41 upward, whereby the operating lever 39 on the hub 32a of the righthand inner test contact carrying arm 32, as viewed in FIG. 1, is moved counterclockwise in this figure. This movement of the operating lever 39 causes the arms 32, which are interconnected by the lugs 37 and the pin and slot connection 38, to move away from one another in unison. Thus, the rows of inner test contacts 21 on the arms 32 are moved from their open solid line positions, as shown in FIGS. 1, 5, 6, and 7, to their closed terminal-engaging positions, as shown in dashed lines in FIGS. 5, 6, and 7. As the rows of test contacts 21 engage and make electrical contact with the inner sides of their respective terminals 12 on the relay 11, they center the relay longitudinally in its associated radial slot 14a and relative to each other, as illustrated in FIGS. 5, 6 and 7, and also straighten or orient the relay longitudinally in the slot if it is skewed therein, so that each of the test contacts properly engages its respective terminal.

The cam 59 of the operating mechanism 51 for the outer test contacts 22 then permits the vertical actuating rod 56 to be moved downward by the action of the coil springs 52, whereby the coil springs cause the outer test contact carrying arms 34, which are interconnected by the lugs 53 and their associated pin and slot connection, to move toward one another in unison. This causes the rows of outer test contacts 22 on the arms 34 to come into engagement with the outer sides of their respective relay terminals 12, as shown in dashed lines in FIGS. 5, 6, and 7, whereby the terminals become firmly gripped between the inner and outer test contacts 21 and 22, so as to insure good electrical contact between the test contacts and the terminals. With the terminals 12 of the relay 11 now electrically connected to the above-mentioned test circuitry (not shown) through the test contacts 21 and 22, the leads 23, the terminals 24 on the terminal strip 26, and the leads 27, the desired tests are performed on the relay.

After the desired tests have been performed on the relay 11 the operating cams 46 and 59 cause the test contact carrying arms 32 and 34 to open so that the tested relay can be indexed out of the test station and a next relay can be indexed into the test station. More specifically, the cam 46, through the lever 42, causes downward movement of the vertical actuating rod 41 against the action of the coil spring 48. This causes movement of the operating lever 39 clockwise, as viewed in FIG. 1, thus causing movement of the interconnected arms 32 and the inner test contacts 21 thereon toward one another and back to their open positions. At substantially the same time the operating cam 59, through the bell crank lever 57, causes upward movement of the vertical actuating rod 56. This causes movement of the operating lever 54 counterclockwise, as viewed in FIG. 1, thus causing the interconnected arms 34 and the outer test contacts 22 thereon to be moved away from one another and back to their open positions.

As each of the relays 11 is indexed into the test station its housing 13 engages the electrical contact roller 63. If the housing 13 is metallic in nature, the contact roller 63, through its lead 66, its associated terminal 24 on the terminal strip 26, and its associated lead 27, connects the housing to the above-mentioned test circuitry for the purpose of testing for shorts between the housing and the relay terminals 12. As the relay 11 subsequently is indexed out of the test station, the lever 64 on which the contact roller 63 is carried, is pivoted by the relay housing 13 against the action of the lever's biasing spring 68 into the dashed line position shown in FIG. 2, whereby the indexing of the relay is permitted to occur.

After the tested relays 11 leave the test station they are indexed by the feed plate 14 into the subsequent stations in which the above-mentioned parts of the sorting mechanism are located. The parts of the sorting mechanism, which have been properly conditioned by the test circuitry, then sort the relays 11, depending upon whether they are acceptable or defective, in a manner well known to those skilled in the art.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. Apparatus for establishing electrical contact with spaced terminals of electrical components wherein the electrical components have component bodies of varying dimensions in the direction of a line extending between the terminals and wherein the terminals project from one side of the component bodies at varying spacings, which comprises:

surface means for supporting the body of each of the components for movement on said surface means substantially parallel to the line extending between the terminals of the component;

a pair of spaced test contacts movable toward and away from one another between open positions and terminal engaging positions along a predetermined path;

indexing means for moving the electrical components to bring the terminals of each component into alignment with the predetermined path of travel of said test contacts, said indexing means including at least one slot for receiving the component body of any one of the electrical components, the slot defining limits for the movement of the component along the line extending between the terminals of the component so that when the terminals are brought into alignment with the predetermined path of travel of said test contacts the terminals are located within limits defined by the open positions of said test contacts; and yieldable means for moving said test contacts substantially simultaneously in opposite directions and into engagement with respective ones of the terminals to effect contralization of the component on said surface means relative to said test contacts, and so that each of said test contacts engages its respective terminal with a predetermined uniform pressure sufficient to establish electrical contact between said test contact and the terminal.

2. Apparatus as recited in claim 1, in which:

said test contacts form parts of respective rows of test contacts which are movable toward and away from one another and respective spaced rows of terminals of the electrical component;

said rows of test contacts are moved by said yieldable means substantially simultaneously in opposite directions toward and into engagement with their respective rows of terminals; and said rows of test contacts cooperate to orient the component upon engaging the rows of terminals so that each of said test contacts engages a respective terminal with pressure sufficient to establish electrical contact between said test contact and the terminal.

3. Apparatus as recited in claim 1, which further comprises:

a pair of arms pivotally mounted on parallel axes for movement toward and away from one another and the terminals, each of the contacts of said pair of test contacts being mounted on one of said arms;

means interconnectiing said arms so that said arms move in unison with one another;

resilient means for moving said arms and said test contacts thereon so that said contacts become engaged with their respective terminals; and means for moving said arms and said test contacts thereon away from the terminals against the action of said resilient means.

4. Apparatus for establishing electrical contact with spaced terminals of an electrical component extending from one side of the component, which comprises:

means for supporting the component for movement substantially parallel to a line extending between the terminals;

a first pair of test contacts mounted between the terminals for movement toward and away from one another and the terminals;

first yieldable means for moving said first pair of test contacts substantially simultaneously and into engagement with inner sides of respective ones of the terminals;

a second pair of test contacts electrically connected in parallel with respective ones of said first pair of test contacts and mounted adjacent outer opposite sides of respective ones of the terminals for movement toward and away from one another and the terminals; and second yieldable means for moving said second pair of test contacts substantially simultaneously and into engagement with the outer sides of respective ones of the terminals, said first and second pairs of test contacts cooperating to effect centralization of the component on said supporting means relative to said test contacts and to grip the terminals firmly therebetween with a predetermined uniform pressure sufficient to establish electrical contact between said test contacts and the terminals.

5. Apparatus as recited in claim 6, in which:

said first and said second yieldable means operate in sequence, respectively.

References Cited

UNITED STATES PATENTS 3,412,333  11/1968  Frick _____ 324—158

RUDOLPH V. ROLINEC, Primary Examiner

E. L. STOLARUN, Assistant Examiner

L-566-PT
(6-69)

UNITED STATES PATENT OFFICE
CERTIFICATE OF CORRECTION

Patent No. 3,543,158     Dated November 24, 1970

Inventor(s) G. O. Stegner

It is certified that error appears in the above-identified patent and that said Letters Patent are hereby corrected as shown below:

Column 2, line 24, "contralization" should read --centralization--. Column 3, line 18, "end" should read --ent--. Column line 29, "betwen" should read --between--. Column 3, line 37, "connetced" should read --connected--. Column 3, line 61, "conttacts" should read --contacts--. Column 3, line 65, "herebetween" should read --therebetween--. Column 3, line 71, "which" should read --with--. Column 4, line 2, "acn" should read --can--. Column 4, line 11, "thte" should read --the--. Column 5, line 38, "components" should read --component--. Column 7, line 17, "indering" should read --indexing--. Column 8, line 69, "contralization" should read --centralization--. Column 10, line 23, "6" should read --4--.

Signed and sealed this 23rd day of March 1971.

(SEAL)
Attest:

EDWARD M. FLETCHER, JR.     WILLIAM E. SCHUYLER, JR
Attesting Officer     Commissioner of Patents